Patented Dec. 18, 1951

2,579,414

UNITED STATES PATENT OFFICE 2,579,414

PREPARATION OF ESTERS OF ORTHO TITANIC ACID

Thomas Boyd, Springfield, Mass., assignor to Monsanto Chemical Company, St. Louis, Mo., a corporation of Delaware No Drawing. Application October 21, 1949, Serial No. 122,841

6 Claims. (Cl. 260—429)

This invention relates to the preparation of esters of ortho titanic acid. More particularly, it relates to the preparation of the esters of ortho titanic acid from titanium disulfide.

An object of this invention is to provide a process for the preparation of the esters of ortho titanic acid.

These and other objects are attained by reacting titanium disulfide with an alcohol or a phenol under substantially anhydrous conditions.

The following examples are given in illustration and are not intended as limitations upon the scope of this invention. Where parts are mentioned, they are parts by weight.

Example I

Tetraethyl ortho titanate was prepared by adding about 4.5 mols of absolute ethyl alcohol to about 1 mol of titanium disulfide. The reaction started immediately. To prevent overheating due to the heat of reaction, the alcohol was added slowly enough so that the reaction temperature remained at or near room temperature through the addition period. After all of the alcohol had been added, the reaction medium was heated at about 65° C. for about 1 hour under refluxing conditions. The reaction mixture was then cooled to room temperature, filtered and rectified by distillation under vacuum. The tetraethyl ortho titanate distilled at 150–152° C. at 10 mm. of mercury pressure. The yield of the ester was better than 95% of theory. During the reaction the hydrogen sulfide produced was collected in a trap containing aqueous sodium hydroxide.

Example II

The absolute ethyl alcohol of the first example was replaced by a similar amount of 2-ethylhexanol. In this case, the initial heat of reaction was much less so that the alcohol could be added to the reaction vessel much more quickly than could the absolute ethanol. The tetra 2-ethylhexyl titanate was obtained in about an 80% yield.

Example III

Titanium disulfide was reacted with phenol in a ratio of 1 mol of titanium disulfide to about 5 mols of phenol. The reaction was considerably slower than that of Example I so that reaction temperature was raised to about 100° C. Otherwise, the reaction proceeded smoothly and a yield of over 80% of theoretical of tetraphenyl ortho titanate was obtained.

Titanium disulfide will react with other alcohols and phenols including polyhydroxy compounds such as polyhydric alcohols and polyhydroxy benzenes, and including substituted alcohols and phenols such as amino, nitro, halogeno, etc. alcohols and phenols. Examples of the alcohols and phenols which may be used are methanol, ethanol, propanol, isopropanol, butanol, isobutanol, tertiary butyl alcohol, amyl alcohols, octyl alcohols, cetyl alcohol, lauryl alcohol, stearyl alcohol, oleyl alcohol, allyl alcohol, methallyl alcohol and other alkenyl alcohols, aralkyl alcohols such as benzyl alcohol, amino alcohols such as ethanol amine, triethanolamine, nitro alcohols such as nitrobutanol, tris hydroxymethyl nitro methane, halogeno alcohols such as chlorethanol, bromobutanol, polyhydric alcohols such as glycols including the glycol ethers such as diethylene glycol, glycerol, sorbitol, mannitol, etc., phenol, p-chlorophenol, m-nitro phenol, aminophenols, cresols, xylenols, resorcinol, catechol, phloroglucinol, phenethyl phenol, etc.

The reaction should be carried out under substantially anhydrous conditions since the products are easily hydrolyzed to titanium dioxide in the presence of water. It is preferable to use an excess of the alcohol or phenol to insure that the reaction will go to completion and in many cases to act as a solvent. The temperature of the reaction may be varied to suit the particular alcohol or phenol being used. The temperature will thus be lower for reaction with the more active and more volatile materials and can be made correspondingly higher for the less active reactants. If desired, the reaction can be carried out in the presence of inert solvents such as benzene, xylene, naphtha hydrocarbons, etc.

The process of this invention provides a simple and easy process for the preparation of esters of ortho titanic acid in relatively high yields. No catalysts or other reaction aids are necessary which might contaminate the product and pose a purification problem.

The esters of ortho titanic acid may be used as mordants and water-repellents in textile and paper manufacture. They also may be used as modifiers in thermoplastic and thermosetting coating compositions.

It is obvious that variations may be made in the process of this invention without departing from the spirit and scope thereof as defined in the appended claims.

What is claimed is:

1. A process for the preparation of ortho esters of titanic acid which comprises reacting titanium disulfide with a compound taken from the group consisting of alcohols and phenols, under substantially anhydrous conditions.

2. A process which comprises reacting titanium disulfide with an alcohol under substantially anhydrous conditions.

3. A process which comprises reacting titanium disulfide with a phenol under substantially anhydrous conditions.

4. A process which comprises reacting titanium disulfide with anhydrous ethanol under substantially anhydrous conditions.

5. A process which comprises reacting titanium disulfide with 2-ethyl hexanol under substantially anhydrous conditions.

6. A process which comprises reacting titanium disulfide with phenol under substantially anhydrous conditions.

THOMAS BOYD.

REFERENCES CITED

The following references are of record in the file of this patent:

UNITED STATES PATENTS

| Number | Name | Date |
|---|---|---|
| 2,187,821 | Nelles | Jan. 23, 1940 |
| 2,410,119 | McCleary | Oct. 29, 1946 |

Patent No. 2,579,414 Certificate of Correction

THOMAS BOYD December 18, 1951

It is hereby certified that error appears in the printed specification of the above numbered patent requiring correction as follows:

Column 2, line 28, after "solvent" and before the period insert *for the product*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*